United States Patent [19]

Jaffe et al.

[11] Patent Number: 4,895,948

[45] Date of Patent: Jan. 23, 1990

[54] PROCESS FOR PREPARATION OF OPAQUE QUINACRIDONES

[75] Inventors: Edward E. Jaffe; Johannes Pfenninger, both of Wilmington, Del.

[73] Assignee: Ciba-Geigy Corporation, Ardsley, N.Y.

[21] Appl. No.: 209,255

[22] Filed: Jun. 20, 1988

[51] Int. Cl.$^4$ ............................................. C09B 48/00
[52] U.S. Cl. .................................................... 546/56
[58] Field of Search ................... 546/56, 49; 106/495, 106/497

[56] References Cited

U.S. PATENT DOCUMENTS

| | | | |
|---|---|---|---|
| 3,298,847 | 1/1967 | Hanke | 546/56 |
| 4,298,398 | 11/1981 | Fitzgerald | 106/497 |
| 4,541,872 | 9/1985 | Jaffe | 546/56 |
| 4,758,665 | 7/1988 | Spietschka et al. | 546/49 |
| 4,760,144 | 7/1988 | Jaffe | 546/49 |
| 4,801,702 | 1/1989 | Bäbler | 546/56 |
| 4,810,304 | 3/1989 | Jaffe et al. | 106/495 |

*Primary Examiner*—Donald G. Daus
*Attorney, Agent, or Firm*—Harry Falber

[57] ABSTRACT

A process for preparing opaque pigmentary quinacridone derivatives which comprises milling the starting quinacridone materials at ambient or near ambient temperatures in the presence of an alcohol and a base.

10 Claims, No Drawings

PROCESS FOR PREPARATION OF OPAQUE QUINACRIDONES

The quinacridone series of compounds and their pigmentary properties are well known, having been described in numerous patents and in the technical literature. This series includes various di-substituted quinacridones such as di-halo and di-alkyl derivatives. Dimethyl derivatives are disclosed, for example, in U.S. Pat. No. 3,264,298, difluoro derivatives in U.S. Pat. No. 3,793,327, and dichloro derivatives in U.S. Pat. No. 4,015,998.

It is well known in the art that quinacridones as synthesized, known as crude quinacridones, are generally unsuitable for use as pigments and must be further processed to develop the requisite pigmentary properties such as particle size, particle shape, crystalline structure, tinctorial strength, phase, etc. The most commonly used processes for converting crude quinacridones to pigmentary form involve milling the crude quinacridone with large quantities of inorganic salt and then extracting the resulting mill powder.

Various attempts to eliminate the use of salt in milling crude quinacridones have been made. For instance, in U.S. Pat. No. 2,857,400 crude pigment is premilled in a ball mill, then homogenized in acetone and recovered from the acetone. In U.S. Pat. No. 3,017,414 crude pigment is premilled in a ball mill, then treated with a water-insoluble organic liquid such as chlorobenzene in water emulsion, and recovered from the emulsion.

Another method for preparing pigmentary quinacridone from crude quinacridone is described in U.S. Pat. No. 3,287,147 wherein the crude quinacridone is either acid pasted or ball milled to provide a product which is formed into a neutral aqueous paste which is then heated at 150° to 300° C. under pressure. Special equipment is required for heating at elevated temperatures and pressure. U.S. Pat. No. 4,024,148 discloses preparation of a novel crystalline form of quinacridone by conditioning precipitated quinacridone in an aqueous slurry thereof in the presence of a large quantity of a water-insoluble liquid having at least one hydroxyl group and a surfactant. The surfactant is retained on the surface of the pigment. In still another method (U.S. Pat. No. 4,094,699) which dispenses with the use of organic solvents, premilled quinacridone is ripened in an aqueous base in the presence of both cationic and nonionic surfactants. Since these procedures generally comprise a diversity of operations conducted at elevated temperatures in acidic environments, simpler, more economical, ambient temperature approaches would be desirable.

U.S. Pat. No. 3,256,285 describes a process for improving the pigment properties of disubstituted quinacridones. The crude products are prepared by cyclizing the corresponding 2,5-diarylaminoterephthalic acids, e.g. in polyphosphoric acid. Aqueous pastes of these crude products are then stirred together with ethanol or a similar solvent at above 120° C., requiring special equipment suitable for high pressure. The pigments prepared by this process are still relatively transparent.

Frequently it is desired to prepare opaque versions of substituted quinacridones. Opacity is generally defined as the ratio of incident to transmitted light intensities. In case of pigments, opacity is increased with increasing light absorption and refractive index. These are inherent physical properties. Optimum opacity can be achieved through maximization of light scattering by virtue of appropriate particle size and particle size distribution. Opacity is desired for purposes of hiding a grey or dark substrate.

Unsubstituted quinacridone of the gamma phase can be produced in an opaque form without additional conditioning steps. Thus, oxidation of beta-6,13-dihydroquinacridone (U.S. Pat. No. 3,007,930) in aqueous methanol or a similar solvent at a relatively low sodium hydroxide concentration (U.S. Pat. No. 2,969,366, table 1), preferably about 3%, yields a relatively large particle size opaque gamma quinacridone with a surface area of 20-30 m2/g (U.S. Pat. No. 2,944,581).

By contrast, when manufacturing beta quinacridone, the sodium salt of 6,13-dihydroquinacridone has to be formed which is then oxidized to the sodium salt of quinacridone and in situ hydrolyzed to beta quinacridone. In order to form the intermediate sodium salt, a relatively high sodium hydroxide concentration is required, usually over 10%, or as high as 29.5% (U.S. Pat. No. 2,969,366, table 1). As a consequence of the high base concentration in conjunction with aqueous alcohol, the crude beta quinacridone is generated in large particle size, showing a specific surface area of 3 to 8 m2/g and a particle size in excess of 1 μm, exceeding the optimum particle size required for reasonable opacity and showing exceedingly low strength in $TiO_2$ extension (tint) and a dark and reasonably transparent masstone.

In the production of substituted quinacridones (e.g. 2,9-dimethylquinacridone or 2,9-dichloroquinacridone), the oxidation of the substituted 6,13-dihydroquinacridone precursors in aqueous methanol is performed at a similar base concentration, as high as 31% based on total liquids, to achieve complete oxidation. As in the case of beta quinacridone, this oxidation procedure in a highly alkaline medium yields very large particle size products (surface area about 8 m2/g for 2,9-dimethylquinacridone and about 10 m2/g for 2,9-dichloroquinacridone) exceeding the minimum particle size required for reasonable opacity and showing very low strength in $TiO_2$ extension (tint).

Accordingly, it is the primary object of this invention to provide an improved method for the preparation of opaque substituted quinacridone pigments.

Various other objects and benefits of this invention will become apparent from the following descriptions thereof.

It has now been surprisingly discovered that opaque disubstituted quinacridone derivatives of pigmentary quality and improved crystallinity can be readily prepared by milling the crude quinacridone precursor materials in an alcohol and in the presence of a base. The process shows great flexibility. A substantial variety of opaque derivatives can be prepared. Crude, premilled or acid pasted quinacridone powders are available for use as starting materials in the process. Of particular merit, the process can be conducted at ambient or near ambient temperatures in a milling operation having either one or a limited number of steps which allows for particle growth to the desired equilibrium size and narrow particle size distribution. The latter aspects are in distinct contrast to the aforementioned prior art approaches which generally require elevated temperatures and several distinct operations. In addition, the appropriate particle size growth permits direct isolation of the pigmentary product from the mill slurry. Finally, the resulting opaque pigments exhibit excellent performance characteristics. They are fast to light and weathering and resistant to attack by solvents. They exhibit superior heat stability, permitting their use in a variety of polymeric materials.

Applicable disubstituted quinacridones may be linear quinacridones of the formula

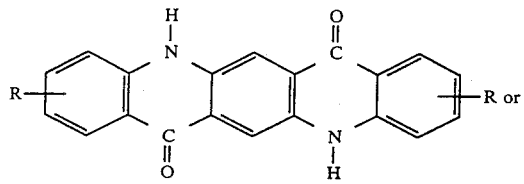

isoquinacridones of the formula

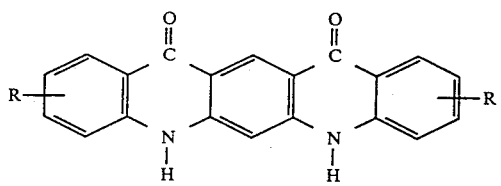

wherein R is independently fluoro, chloro, bromo, lower alkyl or lower alkoxy.

Preferred materials are the 2,9- and 4,11-di-substituted quinacridones, with 3,10-disubstituted quinacridones also being applicable, wherein both substituents are of the same atom or radical selected from the group consisting of F, Cl, Br, $CH_3$, and $OCH_3$.

The instant process generally proceeds by charging the crude, premilled or acid pasted quinacridone, the alcohol and the base to an appropriate mill, introducing the milling elements, milling the system at a temperature of 20° to 40° C. (i.e. ambient or near ambient temperatures) for a period of about 24 to 96 hours and isolating the resulting opaque quinacridone derivative. Applicable alcohols include low boiling alcohols such as methanol, ethanol, butanol and pentanol; and glycols such as ethylene glycol. The alcohol must be stable in the presence of base. Methanol and ethanol are preferred. Applicable inorganic and organic bases include alkali metal hydroxides such as potassium hydroxide, sodium hydroxide, and lithium hydroxide, and quaternary ammonium hydroxides such as benzyltrimethylammonium hydroxide. Sodium and potassium hydroxide are preferred.

Surprisingly, the milling procedure of this invention allows the formation of highly crystalline opaque quinacridones in pigmentary form at ambient temperature, contrary to the cited state of the art procedures that require treatment at elevated temperatures. Correspondingly, as the final pigment particles are generally formed during the milling, no additional heating period is essential.

As noted above, crude pigments or subpigmentary powders obtained, e.g., through premilling or acid pasting of crude quinacridones, can be used in the milling procedure of this invention. Premilling operations are known and, as used in the invention, refer to milling in the complete absence of liquids, or if liquids are used, such as a phase directing solvent or a surface active agent, they are present in such small amounts (maximum of about 10% by weight of pigment) or of such a nature that the pigment retains the characteristics of a powder. The premilling is optionally carried out in the presence of a small amount, 10% or less, of a salt such as anhydrous sodium sulfate to avoid possible explosivity of the generated mill powder. The premilling can be carried out with a variety of milling media, such as steel balls and nails, steel shot or ceramic balls or beads. If premilling is carried out with steel milling media, it is desirable to extract the pigment slurry at the end of the milling procedure of this invention with dilute mineral acid to remove any metal that wears off from the media during the milling operation.

Acid pasting refers to dissolving the crude pigments in concentrated sulfuric acid and subsequently generating subpigmentary particles by addition of the pigment solution to water directly or under high turbulence conditions.

For the basified alcohol milling procedure of this invention, a variety of milling media are suitable, e.g., steel shot or ceramic beads. Of the former, ⅛" steel shot is suitable, while of the latter, different sizes and compositions are available. Grinding beads of 1.6 to 2.5 mm. or 2.5 to 3.15 mm size made from crystalline zirconia phase and amorphous silica phase by fusion of the oxides are particularly suitable. Zirconium oxide beads containing small amounts of magnesium oxide are similarly useful. As mentioned above, if steel milling media are used, an acid extraction of the pigment slurry after milling is desirable.

The concentrations of alcohol and base are selected to optimize pigmentary properties. The alcohol is generally present in an amount ranging from 5 to 25 times the weight of pigment, and preferably 12 to 20 times. Correspondingly, the base is generally present as an aqueous solution (on a base content) in an amount ranging from 0.5 to 10.0%, by weight of alcohol, and preferably 1.0–5.0%.

In the absence of an appropriate amount of base, particle change or growth is minimal. At the desirable base concentration range, there is no visible formation of the quinacridone potassium, sodium or quaternary ammonium salt, which when formed can be easily recognized due to its distinct blue color. However, during the milling operation, as new surfaces are generated, the mechanism of particle growth is believed to involve formation of a very small concentration of the salt, which is more soluble in alcohol than quinacridone itself and thus subject to particle growth followed by alcoholysis to the pigment. This dynamic particle ripening system eventually permits total form conversion and particle growth to the desirable equilibrium size.

If desired, various surfactants or extenders can be introduced in the basified alcohol milling step, provided the additives are not inactivated by the basic medium. Simple addition of anionic (subject to salt formation), cationic or nonionic surfactants to the liquid milling operation, assuming the materials are not water soluble, will cause them to come out in a uniform manner on the surface of the pigment during alcohol removal and, consequently, frequently alter the pigment properties.

Since the nearly ultimate particle size is generated in the liquid milling step, the product can be isolated directly from the mill slurry after milling media separation, provided no acid extraction is required. However, the pigment is best isolated after alcohol removal from distillation. After the milling media have been separated and washed free of pigment, the resulting pigment slurry is either steam distilled, or diluted with water and alcohol distilled with external heat until the residue is essentially alcohol free. The alcohol is thus recovered and the pigment isolated from a nonflammable slurry by filtration. After isolation, the pigment is washed free of base with water. The resulting pigments show excellent crystallinity by X-ray diffraction, generally surpassing counterparts prepared by state of the art procedures.

Like many other pigments, the products of the invention can be advantageously surface treated by known methods to improve their performance in a variety of automotive and other finish systems. Additives which serve to lessen or avoid flocculation and increase pigment dispersion stability can be advantageously used. When so treated, the pigments show outstanding performance on their own or as blending agents in a variety of systems, e.g. automotive finishes, such as acrylics, alkyds, polyester and other systems. 2-Phthalimidomethylquinacridone, quinacridonesulfonic acid, or other similar derivatives can serve as additive antiflocculating agents. In some systems, the addition of polymeric dispersants further improves the performance of these pigments.

Pigmented systems which contain the pigments as a component of mixtures of substances, possibly in addition to other components, include: pastes, flush pastes, preparations, printing colors, distempers, binder colors or lacquers and varnishes of all kinds, such as physically and oxidatively drying lacquers and varnishes, acid, amine and peroxide curing varnishes or polyurethane varnishes. The pigments may also be present in synthetic, semi-synthetic or natural macromolecular substances, such as thermoplastic resins, e.g., polyvinyl chloride, polystyrene, polyethylene, polyesters, phenoplasts, aminoplasts and rubber. The pigment may also be present in admixture with natural, regenerated or synthetic fibers, such as glass, silicate, asbestos, wood cellulose, acetylcellulose, polyacrylonitrile, polyester, polyurethane and polyvinyl chloride fibers or mixtures of the same, and also in powders, for example, organic or inorganic pigments.

The mixtures of substances which contain as active coloring ingredient the pigments of this invention, may be of solid, elastic, pasty, viscous, mobile or thixotropic consistency. They may be obtained by conventional methods. Aqueous pastes may be obtained for example by stirring the pigments into water, possibly with the addition of a wetting or dispersing agent or by stirring or kneading the pigments into a dispersing agent in the presence of water and possibly of organic solvents or oils. These pastes may for example be used for the production of flush pastes, printing colors, distempers, plastic dispersions and spinning solutions. The pigments may also be introduced by stirring, rolling, kneading or grinding into water, organic solvents, non-drying oils, drying oils, lacquers, varnishes, plastics or rubber. Finally, it is also possible to work up the pigments by dry mixing with organic or inorganic masses, granulates, fibrous materials, powders and other pigments, to form mixtures of substances.

In addition to their high crystallinity, good general fastness, such as fastness to light and weathering, and solvent and softener resistance, the pigments are also characterized by superior resistance to high temperatures. For example, the thermal behavior of the pigments makes it possible to work them into high and low density polyethylene or polypropylene, without the shade of color being dulled by the effect of the temperature during processing.

The following examples further illustrate the embodiments of this invention. In these examples, all parts given are by weight unless otherwise indicated.

EXAMPLE 1

This example describes the preparation of large particle size, opaque 2,9-dimethylquinacridone directly from crude starting material.

A 236 ml mill is charged with 300 parts ceramic beads ranging in size from 1.6 to 2.5 mm and consisting on average of about 69% $ZrO_2$ and 31% $SiO_2$, 6 parts crude 2,9-dimethylquinacridone, 79 parts methanol and 7.5 parts 44% aqueous potassium hydroxide. The mill is rotated for 72 hours at about 30° C. and about 74% of its critical speed.

The pigment slurry is separated from the beads and the latter washed with methanol. The combined slurries are steam distilled until the temperature of the aqueous pigment suspension reaches 95° C. The temperature is maintained for about 10 minutes, the pigment isolated by filtration, washed free of base with water and dried. After drying at 80° C., the weight of the pigment is 5.6 parts. In lithographic varnish rubout comparison, the pigment of this Example is much lighter and more opaque in masstone than a commercial 2,9-dimethylquinacridone. The surface area is 41.4 $m^2/g$ for the pigment of this Example.

A virtually identical pigment (rubout, X-ray and surface area) is obtained after separation of the pigment slurry from the milling media followed by pigment isolation from the slurry, washing and drying. Thus, the distillation step is not essential and all operations can be conducted at room temperature.

EXAMPLE 2

This example describes the preparation of a single phase relatively opaque 2,9-dimethylquinacridone.

A laboratory scale mill is charged with 1500 parts steel balls (diameter ½ inch=0.0127 m), 1500 parts roofing nails, 50 parts crude 2,9-dimethylquinacridone and 5 parts anhydrous sodium sulfate. The mill is rotated at about 75% of its critical speed for 48 hours. The balls and nails are separated with a screen and the dry mill powder is recovered.

Thereafter, 50 parts of the millpowder are introduced into a 2.84 liter laboratory scale mill containing 2500 parts ceramic beads ranging in size from 1.6 to 2.5 mm, 791 parts methanol and 75 parts 50% aqueous sodium hydroxide. The mill is rotated at about 30° C. and about 74% of the critical speed for 72 hours. The mill is discharged onto a screen which retains the ceramic beads. The beads are washed with 632 parts methanol, so that essentially all of the pigment is collected as a slurry. The basic slurry is transferred to a 4-neck flask equipped with a stirrer, thermometer, Dean Stark tube and condenser. Steam is passed through the slurry and methanol together with some water is distilled off until the temperature reaches 95° C.

The slurry is cooled to 80° C., acidified with 20% sulfuric acid to pH=1.5, heated to about 95° C. and retained at 95° C. for one hour, whereupon the product is isolated by filtration and washed with hot water until free of acid. The product is dried at 80° C. to yield 41 parts of 2,9-dimethylquinacridone with the same X-ray diffraction pattern as described in U.S. Pat. No. 3,264,298 (yellow shade form, Example 3). The surface area of the product is 42.4 $m^2/g$.

Tinctorial qualities are determined utilizing rubouts in lithographic varnish prepared with a Hoover Muller. The apparatus is equipped with a ⅛ HP 110-22 V, 60 cycle motor and two glass plates. The Muller can be adjusted to stop after 25, 50, 75, or 100 revolutions with 50 revolutions being considered normal. Three weights are used which apply 150 pounds pressure between the plates. In each case, 0.6 parts of dry pigment and 1.2 parts of a lithographic varnish drier are mixed with a spatula on the lower glass plate. The upper plate is locked to the lower plate and the motor is set to stop after fifty revolutions. The plates are separated and the pigment in ink dispersion is picked up and spread out again on the lower plate and the operation repeated six more times. The resulting pigment as an ink dispersion, referred to as the masstone ink, is drawn down versus an appropriate control prepared in the identical manner. In order to assess color strengths of the samples, calculated amounts of the masstone ink (0.18 parts) and a zinc oxide paste dispersion (10 parts) are weighed accurately and mixed with a spatula on a polished glass plate. The resulting extensions, referred to as tints, are drawn down versus an appropriate control prepared in an identical manner. Visual comparison of both the masstones and tints are made wet and after drying at room temperature for several days.

When the pigment of this Example is rubbed out in a lithographic varnish, it exhibits a relatively light, opaque masstone.

EXAMPLE 3

This example describes the preparation of pigmentary 2,9-dimethylquinacridone by acid pasting followed by milling in basified alcohol.

Ten parts crude 2,9-dimethylquinacridone are dissolved in 100 parts concentrated sulfuric acid. The solution is slowly poured into 1000 parts ice and water and the mixture is stirred for 30 minutes at a maximum temperature of 3° C. The pigment is filtered, washed with water free of acid and dried at 80° C. Nine and a half parts of very low crystallinity (X-ray diffraction pattern) product are isolated. The product is highly aggregated, showing by rubout a dark masstone and a very weak tint.

Six parts of the above acid precipitated product are then milled at about 30° C. in a 236 ml laboratory scale mill filled with 300 parts ceramic beads, 79 parts methanol and 5.4 parts 50% aqueous sodium hydroxide for 72 hours. The pigment slurry is separated from the beads and the latter washed with methanol. The combined slurries are heated at reflux temperature for 30 minutes and then steam distilled until the temperature of the suspension reaches 95° C. The temperature is maintained for about 10 minutes. The pigment is isolated by filtration, washed free of base with water, and dried. Five and seven tenths parts of a pigment with a surface area of 41.9 m²/g are recovered. Its X-ray diffraction pattern and its rubout properties are very similar to the product described in Example 2.

EXAMPLE 4

This example describes the preparation of a relatively opaque 2,9-dichloroquinacridone directly from crude starting material.

Fifty parts of crude 2,9-dichloroquinacridone are introduced into 2.84 liter laboratory scale mill containing 2500 parts ceramic beads (ref. Example 1), 791 parts methanol and 75 parts 50% aqueous sodium hydroxide. The mill is rotated at about 30° C. and about 74% of the critical speed for 72 hours.

The pigment slurry is then separated from the beads and transferred to a 4-neck flask as described in Example 2. After a reflux period of 30 minutes, steam is passed through the slurry and methanol together with some water is distilled off until the temperature reaches 95° C. The slurry is cooled to 80° C. and the product is isolated by filtration and washed with hot water until free of base. After drying at 80° C., 46.0 parts of a relatively opaque pigment with a surface area of 40.7 m²/g are isolated. The X-ray diffraction pattern is very similar to the pattern described in U.S. Pat. No. 3,157,659 (gamma-modification of 2,9-dichloroquinacridone) and is well defined, indicating a high degree of crystallinity of the product.

Summarizing, it is seen that this invention provides an improved approach to the preparation of relatively opaque quinacridone derivatives. Variations may be made in proportions, procedures and materials without departing from the scope of the invention as defined by the following claims.

What is claimed is:

1. A process for the preparation of opaque disubstituted quinacridone compounds corresponding to the formulae

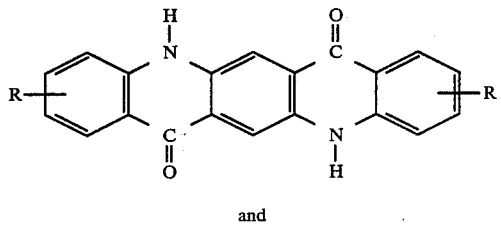

and

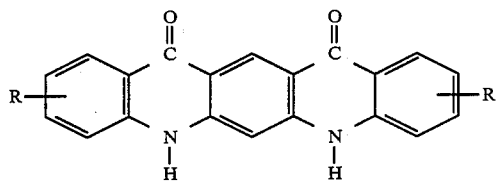

where R are independently F, Cl, Br, lower alkyl, or lower alkoxy, which consists essentially of milling the crude or subpigmentary form of the quinacridone compound in the presence of an amount 5–25 times the weight of said quinacridone compound of a low boiling alkanol or glycol and 0.5–10.0%, by weight of said alkanol or glycol, of an alkali metal hydroxide or a quaternary ammonium hydroxide, and isolating the resulting opaque compound.

2. The process of claim 1, wherein said quinacridone compound is a 2,9-disubstituted or 4,11-disubstituted quinacridone wherein both substituents are the same and are F, Cl, Br, CH₃ or OCH₃.

3. The process of claim 2, wherein said compound is 2,9-dichloroquinacridone.

4. The process of claim 2, wherein said compound is 2,9-dimethylquinacridone.

5. The process of claim 2, wherein said compound is 4,11-dichloroquinacridone.

6. The process of claim 1, wherein said alcohol is selected from the group consisting of methanol, ethanol, butanol, pentanol and ethylene glycol.

7. The process of claim 6, wherein said alcohol is methanol.

8. The process of claim 1, wherein said base is potassium hydroxide or sodium hydroxide.

9. The process of claim 1, wherein said alcohol is methanol and said base is potassium hydroxide or sodium hydroxide.

10. The process of claim 1, wherein said subpigmentary quinacridone compounds result from the dry premilling or acid pasting of crude quinacridone compounds.

* * * * *